(12) United States Patent
Pickens et al.

(10) Patent No.: US 7,703,738 B2
(45) Date of Patent: Apr. 27, 2010

(54) SYSTEM AND METHOD FOR ASSEMBLING A STRUCTURE

(75) Inventors: Jon David Pickens, Atlanta, GA (US); Arthur Kevin Shumate, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 427 days.

(21) Appl. No.: 11/341,219

(22) Filed: Jan. 26, 2006

(65) Prior Publication Data

US 2006/0266539 A1 Nov. 30, 2006

Related U.S. Application Data

(60) Provisional application No. 60/686,054, filed on May 31, 2005.

(51) Int. Cl.
*A01K 97/10* (2006.01)

(52) U.S. Cl. .................. 248/535; 248/534; 248/220.22; 248/291.1; 248/507; 16/387; 24/16 PB; 403/235

(58) Field of Classification Search .............. 248/218.4, 248/149, 150, 152, 176.1, 176.3, 213.1, 219.1, 248/291.1, 507, 508, 226.2, 220.21, 220.22, 248/513, 514, 515, 523, 524, 528, 534, 535; 16/221, 387, 388; 361/664, 665; 174/535; 335/202; 403/235, 344; 24/16 PB, 483
See application file for complete search history.

(56) References Cited

U.S. PATENT DOCUMENTS

| | | | | |
|---|---|---|---|---|
| 3,017,183 A | | 1/1962 | Chalcroft | |
| 3,268,946 A | * | 8/1966 | Case | ............................ 16/253 |
| 3,998,562 A | * | 12/1976 | Gostling | ...................... 403/235 |
| 4,079,559 A | | 3/1978 | Tenbrummeler | |
| 4,675,942 A | * | 6/1987 | Julien, Jr. | ...................... 16/384 |
| 4,986,687 A | | 1/1991 | Ivey | |
| 5,190,337 A | * | 3/1993 | McDaniel | ....................... 296/3 |
| 5,438,789 A | * | 8/1995 | Emory | ......................... 43/21.2 |
| 5,746,533 A | * | 5/1998 | Schmidt | ...................... 403/102 |
| 5,971,187 A | * | 10/1999 | Clee et al. | ................... 220/4.29 |
| 6,170,900 B1 | * | 1/2001 | Kooiker | ................. 296/107.09 |
| 6,241,630 B1 | | 6/2001 | Alberti | |
| 6,765,787 B2 | * | 7/2004 | Beasley et al. | .............. 361/641 |
| 7,085,128 B2 | * | 8/2006 | Wilfong | ...................... 361/665 |
| 7,240,400 B2 | * | 7/2007 | Bonham | ....................... 16/238 |
| 7,302,896 B2 | * | 12/2007 | Polidar et al. | ............... 108/115 |
| 7,314,205 B2 | * | 1/2008 | Pickens et al. | .............. 248/507 |
| 2004/0221543 A1 | | 11/2004 | Eleas | |

* cited by examiner

*Primary Examiner*—A. Joseph Wujciak, III
*Assistant Examiner*—Todd M. Epps
(74) *Attorney, Agent, or Firm*—Jose de la Rosa

(57) ABSTRACT

Certain exemplary embodiments can comprise a system comprising a first bracket, which can be adapted to be coupled to a first pole. The first bracket can comprise a collar defining a cavity, which can be adapted to receive the first pole. The system can comprise a second bracket, which can be adapted to be coupled to a second pole. The second bracket can comprise a collar defining a cavity, which can be adapted to receive the second pole. The second bracket can be adapted to be rotateably coupled to the first bracket via a hinge. The second bracket can be adapted to be releaseably coupled to the first bracket via a substantially non-destructively removable fastener.

14 Claims, 2 Drawing Sheets

SYSTEM AND METHOD FOR ASSEMBLING A STRUCTURE

CROSS-REFERENCES TO RELATED APPLICATIONS

This application claims priority to U.S. Provisional Patent Application Ser. No. 60/686,054, filed 31 May 2005.

BACKGROUND

Eleas (U.S. Patent Publication Number 20040221543) allegedly recites a "structure for mounting a pole firmly in the ground, the structure having an anchor section and a pole section, wherein the anchor section is an auger, wherein the sections are hinged together with the pole section lying on the ground after the auger is screwed into the ground, and wherein the pole section can then be hoisted or lifted around hinge to an upright position, and wherein cooperating elements of connector structure are provided on the sections for firmly affixing the sections together with the anchor section remaining in the ground and with the pole in a desired upright position." See Abstract.

Alberti (U.S. Pat. No. 6,241,630) allegedly recites a "sports pole includes two to four elongated tubular members permanently joined together with a first of the tubular members or poles pivotably joined near one end to a second of the poles. A third of the poles may be telescopically received within or about the first pole and slidingly movable therealong between retracted and extended positions. There is a U-shaped spring and pin arrangement for locking the third tubular member in the extended position. A fourth of the poles may be telescopically received within or about the second pole and be similarly slidingly movable therealong between retracted and extended positions. Again, there is a U-shaped spring and pin arrangement for locking the fourth tubular member in the extended position. The first and second tubular members are pivotably joined by a hinge mechanism which allows selective pivotal motion between generally coaxial and generally parallel positions. A locking arrangement prevents pivotable motion between the first and second members when the first and second members are in the coaxial position. This unique combination of hinging with telescoping allows compacting of the sports pole structure with no disassembly." See Abstract.

Ivey (U.S. Pat. No. 4,986,687) allegedly recites a "breakaway system is disclosed for timber utility poles. The breakaway system limits the amount of force and energy imparted to an impacting vehicle and its occupants by incorporating an arrangement of slip plates and bolts to form a shear plane on the utility pole at or near ground level, and by providing a hinge mechanism on an upper section of the utility pole below conducting lines and the like. The material and configuration of the lower shear plates are selected to permit activation for any direction of collision loading. The material and configuration of the upper connection or hinge are selected to allow for adequate resistance to environmental loads while at the same time allowing for precise determination of the magnitude of failure load. In addition, the combination of upper connectors prevents the lower portion of the utility pole from rotating upward into the conducting wires after a vehicle impact. In this manner, impact by a moving vehicle with a timber utility pole equipped with the breakaway device shears the lower connection causing a middle portion of the timber utility pole to rotate upward. The upper connection allows limited rotation sufficient to permit the impacting vehicle safely to travel completely beneath the middle section of the utility pole while at the same time preventing the middle section from impacting the conducting wires carried by the utility pole." See Abstract.

SUMMARY

Certain exemplary embodiments can comprise a system comprising a first bracket, which can be adapted to be coupled to a first pole. The first bracket can comprise a collar defining a cavity, which can be adapted to receive the first pole. The system can comprise a second bracket, which can be adapted to be coupled to a second pole. The second bracket can comprise a collar defining a cavity, which can be adapted to receive the second pole. The second bracket can be adapted to be rotateably coupled to the first bracket via a hinge. The second bracket can be adapted to be releaseably coupled to the first bracket via a substantially non-destructively removable fastener.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
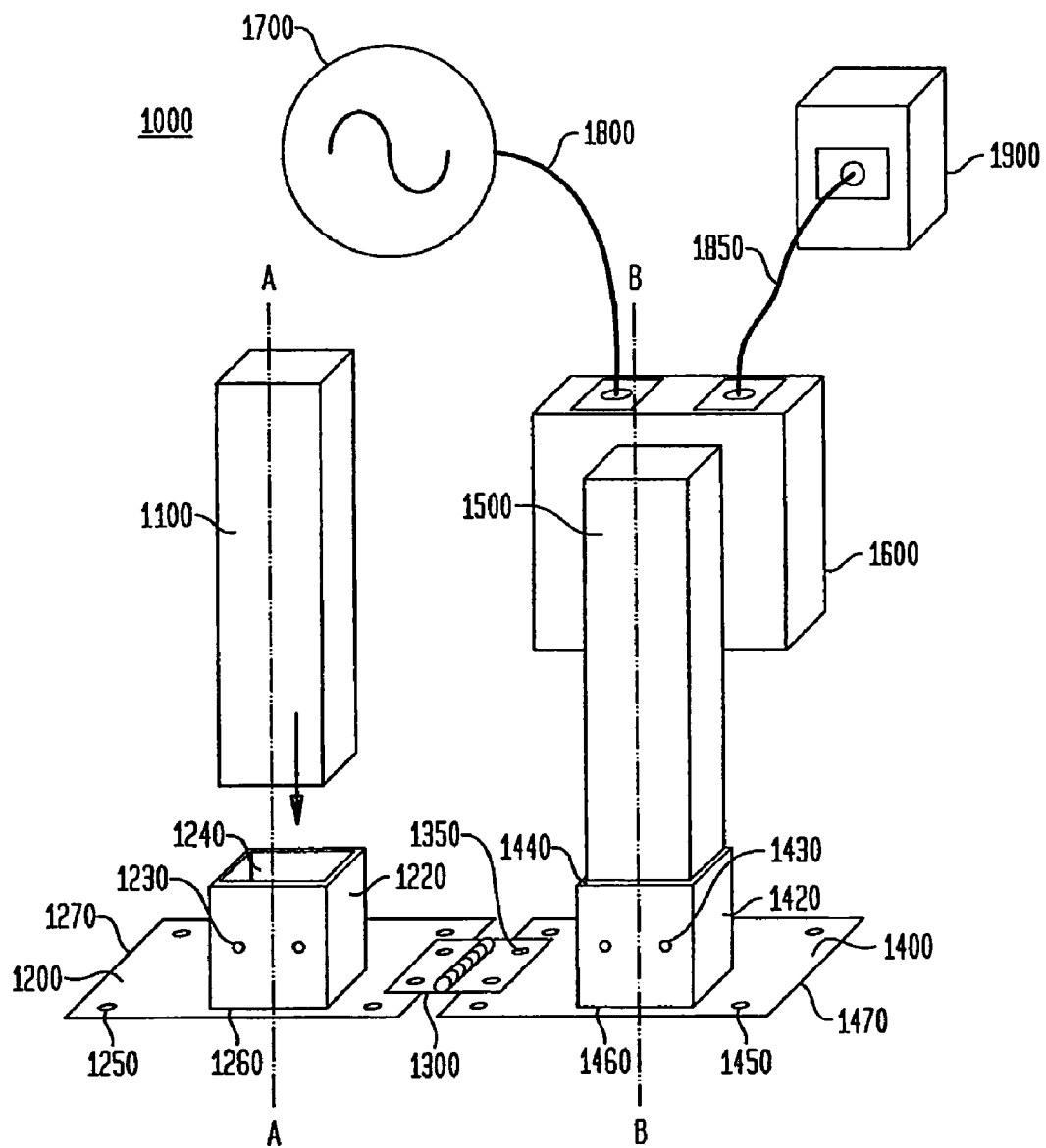
FIG. 1 is a perspective view of an exemplary embodiment of a system 1000.

When the following terms are used substantively herein, the accompanying definitions apply:

a—at least one.

activity—an action, act, step, and/or process or portion thereof.

adapted to—made suitable or fit for a specific use or situation.

adapter—a device used to effect operative compatibility between different parts of one or more pieces of an apparatus or system.

and/or—either in conjunction with or in alternative to.

apparatus—an appliance or device for a particular purpose bracket—a weight bearing and/or motion restraining structural component. A bracket can be made of plastic material, aluminum, stainless steel, and/or painted carbon steel, etc.

breaker panel—a housing adapted to contain electrical components, such as a circuit interrupter, meter, and/or circuit breaker, adapted to manage electrical energy to an electrical device and/or in a circuit.

can—is capable of, in at least some embodiments.

cap—a cover.

collar—a shaped object defining a cavity adapted to at least partially encase another object.

comprising—including but not limited to.

connect—to join or fasten together.

construction site—a location at which building takes place.

couple—to join, connect, and/or link together.

coupleable—capable of being joined, connected, and/or linked together.

coupling—linking in some fashion.

define—to establish the outline, form, or structure of.

device—a machine, manufacture, and/or collection thereof.

direction—a distance independent relationship between two points in space that specifies the position of either with respect to the other; the relationship by which the alignment or orientation of any position with respect to any other position is established.
electrical—pertaining to electricity.
energy—usable power.
fasten—to attach to something else and/or to hold something in place.
fastener—one (or more) restraint that attaches to, extends through, penetrates, and/or holds something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
flange—a protruding rim, edge, rib, or collar.
hinge—a movable joint used to fasten two things together and to allow at least one of them to pivot relative to the other.
install—to connect or set in position and prepare for use.
length—a measurement of a greatest dimension of an object.
longitudinal axis—a straight line defined parallel to an object's length and passing through a centroid of the object.
manage—to direct or control.
may—is allowed and/or permitted to, in at least some embodiments.
method—a process, procedure, and/or collection of related activities for accomplishing something.
motion—changing position or place.
non-destructively—of, relating to, or being a process that does not result in damage to the subject material and/or product and/or results in such minimal damage that the subject material and/or product can be re-used for its intended purpose.
obtain—to procure and/or receive.
opposing—opposite to and/or pointing or facing away from each other.
perpendicular—substantially at a right angle with respect to an axis.
plurality—the state of being plural and/or more than one.
pole—a long relatively slender rod or piece of material. A pole can be fabricated from a plastic material, wood, aluminum, stainless steel, and/or painted carbon steel, etc. A pole can comprise any cross-sectional profile such as substantially square, substantially round, elliptical, rectangular, trapezoidal, and/or a regular polygon, etc. For example, a pole can be a treated lumber 4×4 of any suitable length.
predetermined—established in advance.
provide—to furnish and/or supply.
provision—an act of furnishing and/or supplying.
receive—accept something provided and/or given.
relative—in comparison with.
releaseably—capable of being freed from something that binds, fastens, or holds back.
removable—capable of being moved from a place or position occupied.
removal—to be moved from a place or position occupied.
repeatedly—again and again; repetitively.
rest—to not move and/or be supported by.
restrain—to limit and/or restrict.
rotational—about and/or around an axis.
secure—to fasten.
set—a related plurality.
slideably—a smooth and/or continuous motion of one object relative to another.
substantially—to a great extent or degree.
support—to bear the weight of, especially from below.
system—a collection of mechanisms, devices, data, and/or instructions, the collection designed to perform one or more specific functions.
via—by way of and/or utilizing.
wires—insulated strands of an electrically conductive metal.

DETAILED DESCRIPTION

Certain exemplary embodiments comprise a system comprising a first bracket, which can be adapted to be coupled to a first pole. The first bracket can comprise a collar defining a cavity, which can be adapted to receive the first pole. The system can comprise a second bracket, which can be adapted to be coupled to a second pole. The second bracket can comprise a collar defining a cavity, which can be adapted to receive the second pole. The second bracket can be adapted to be rotateably coupled to the first bracket via a hinge. The second bracket can be adapted to be releaseably coupled to the first bracket via a substantially non-destructively removable fastener.

FIG. 1 is a perspective view of an exemplary embodiment of a system 1000, which can comprise a first bracket 1200 adapted to be releaseably coupled to a first pole 1100. First bracket 1200 can comprise a collar 1220 defining a cavity 1240, which can be adapted to slideably receive first pole 1100. A cap 1260 comprised in a planar surface of first bracket 1200 can terminate cavity 1240. Collar 1220 can define a fastener receiving opening 1230. Fastener receiving opening 1230 can be one of a plurality of fastener receiving openings, which can be adapted to receive a substantially non-destructively removable first fastener. The first fastener can be adapted to releaseably secure first pole 1100 to first bracket 1200.

First pole 1100 can define a longitudinal axis A-A that extends in a first direction, such as upward, and in an opposing second direction, such as downward. First bracket 1200 can be adapted to restrain motion of pole 1100 relative to the first bracket 1200 in the first direction of the longitudinal axis A-A. The first collar of first bracket 1200 can be adapted to restrain motion of first pole 1100 relative to the first collar perpendicular to longitudinal axis A-A. The first collar of first bracket 1200 can be adapted to restrain rotational motion of first pole 1100 about longitudinal axis A-A.

System 1000 can comprise a second bracket 1500, which can be adapted to be releaseably coupled to a second pole 1400. Second bracket 1400 can comprise a collar 1420 defining a cavity 1440. Cavity 1440 can be adapted to slideably receive second pole 1500. A cap 1460 comprised in a planar surface of second bracket 1400 can terminate cavity 1440. Collar 1420 can define a fastener receiving opening 1430, which can be adapted to receive a substantially non-destructively removable second fastener. The substantially non-destructively removable second fastener can be adapted to releaseably secure second pole 1500 to second bracket 1400. In certain exemplary embodiments, a removal of the substantially non-destructively removable second fastener from second bracket 1400 and/or second pole 150 can allow a substantially non-destructive removal of second pole 1500 from second bracket 1400.

Second pole 1500 can define a longitudinal axis B-B that extends in a third direction, such as upward, and in an opposing fourth direction, such as downward. Second bracket 1400 can be adapted to restrain motion of second pole 1500 relative to second bracket 1400 in the third direction. The second collar of second bracket 1400 can be adapted to restrain motion of second pole 1500 relative to the second collar perpendicular to longitudinal axis B-B. The second collar of second bracket 1400 can be adapted to restrain rotational motion of second pole 1500 about longitudinal axis B-B.

First bracket 1200 and/or second bracket 1400 can comprise a plurality of substantially planar surfaces.

A length of collar 1220 and/or collar 1420 can be related to a degree of restraint of motion of poles 1100, 1500 perpendicular to longitudinal axes A-A, B-B. For example, if the length of collar 1220 and/or collar 1420 is less than approximately a width of poles 1100, 1500; poles 1100, 1500 will be less restrained than if the length of collar 1220 and/or collar 1420 is greater than approximately the width of poles 1100, 1500. If the width of poles 1100, 1500 is designated as W, the length of collar 1220 and/or collar 1420 can be approximately 0.05 W, 0.2 W, 0.45 W, 0.5 W, 0.92 W, 1.0 W, 2.4 W, 3 W, 4 W, 7.5 W, 9 W, 10.7 W, 12 W, and/or any value therebetween. Moreover, the degree of restraint of motion of poles 1100, 1500 perpendicular to longitudinal axes A-A, B-B can be related to a closeness of fit of collar 1220 and/or collar 1420 to poles 1100, 1500. For example, if collar 1220 and/or collar 1420 are only a millimeter larger dimensionally than poles 1100, 1500, motion will be restrained to a greater extent than if collar 1220 and/or collar 1420 are over a centimeter larger in each dimension as compared to poles 1100, 1500. Collar 1220 and/or collar 1420 can be larger in a width or depth than poles 1100, 1500, in millimeters, by approximately 1, 2.5, 8, 44, 56.5, 125, 458.5, 756, 989.3, 1500, and/or any value therebetween.

Second bracket 1400 can be adapted to be mechanically coupled to first bracket 1200 via a hinge 1300. Hinge 1300 can be adapted to be secured to first bracket 1200 and second bracket 1400 via a defined third fastener receiving opening 1350, which can be adapted to receive one of a plurality of fasteners adapted to couple hinge 1300 to first bracket 1200 and/or second bracket 1400.

Second bracket 1400 can be adapted to be releaseably coupled to first bracket 1200 via a substantially non-destructively removable fourth fastener. First bracket 1200 can define a flange 1270 coupling fastener opening 1250, which can be adapted to receive a fourth fastener.

In certain exemplary embodiments, the fourth fastener can be removable. Second bracket 1400 can define a flange 1470 coupling fastener opening 1450, which can be adapted to receive the fourth fastener. Flange coupling fastener openings 1250, 1450 can be comprised in a plurality of openings defined respectively by first bracket 1200 and second bracket 1400. The substantially non-destructively removable fourth fastener can secure first bracket 1200 to second bracket 1400 via flange coupling fastener openings 1250, 1450. In an operative embodiment, the fourth fastener can be adapted to be installed when hinge 1300 is rotateably turned such that substantially planar surfaces of first bracket 1200 and second bracket 1400 are substantially parallel to, and adjacent to each other.

In certain exemplary embodiments, a means is provided to collapse an approximately and/or nominally 4 inch by approximately and/or nominally 4 inch wooden pole of a length substantially equivalent to a length of pole 1100 and pole 1500 taken together. In certain exemplary embodiments, system 1000 can be used for a system adapted to provide temporary power, such as via outlets.

Collapsing pole 1100 and pole 1500 to the arrangement illustrated in FIG. 1 can make the system, when folded, smaller in total length and easier to transport from one job site to another. Temporary panels can often be used multiple times prior to disposal.

Panel 1600 can be a breaker panel, electrical disconnect, electrical motor starter, and/or fuse box, etc. Panel 1600 can be adapted to manage provision of electrical energy, at least on a temporary basis, to electrical device 1900, such as an electrically powered tool, light, motor, information device, power strip, breaker panel, and/or machine, etc. Panel 1600 can be adapted, for example, to supply electrical energy at a location such as a construction site, sports facility, mobile plant, camp site, recreational facility, trailer home, emergency site, and/or a farm, etc. Panel 1600 can be fabricated from a material such as a plastic material, aluminum, stainless steel, and/or painted carbon steel, etc. Panel 1600 can define a substantially rectangular cross section. Panel 1600 can comprise a plurality of planar surfaces, such as a back planar surface, one or more side planar surfaces, a top planar surface, a bottom planar surface, and/or a front planar surface, etc. Panel 1600 can be adapted to house one or more electrical components such as an electrical breaker, circuit board, fuse assembly, and/or electrical starter, etc. Panel 1600 can be adapted to accept a plurality of electrical wires, which can be electrically coupled to an electrical component therein.

Panel 1600 can be adapted to manage provision of electrical energy to an electrical device 1900. Panel 1600 can be adapted to be electrically coupled to an electrical energy supply 1700 via a wire 1800. Panel 1600 can be adapted to be coupled to electrical device 1900 via a wire 1850. In certain exemplary embodiments, wires 1800, 1850 can each be a plurality of wires.

Figure 2:
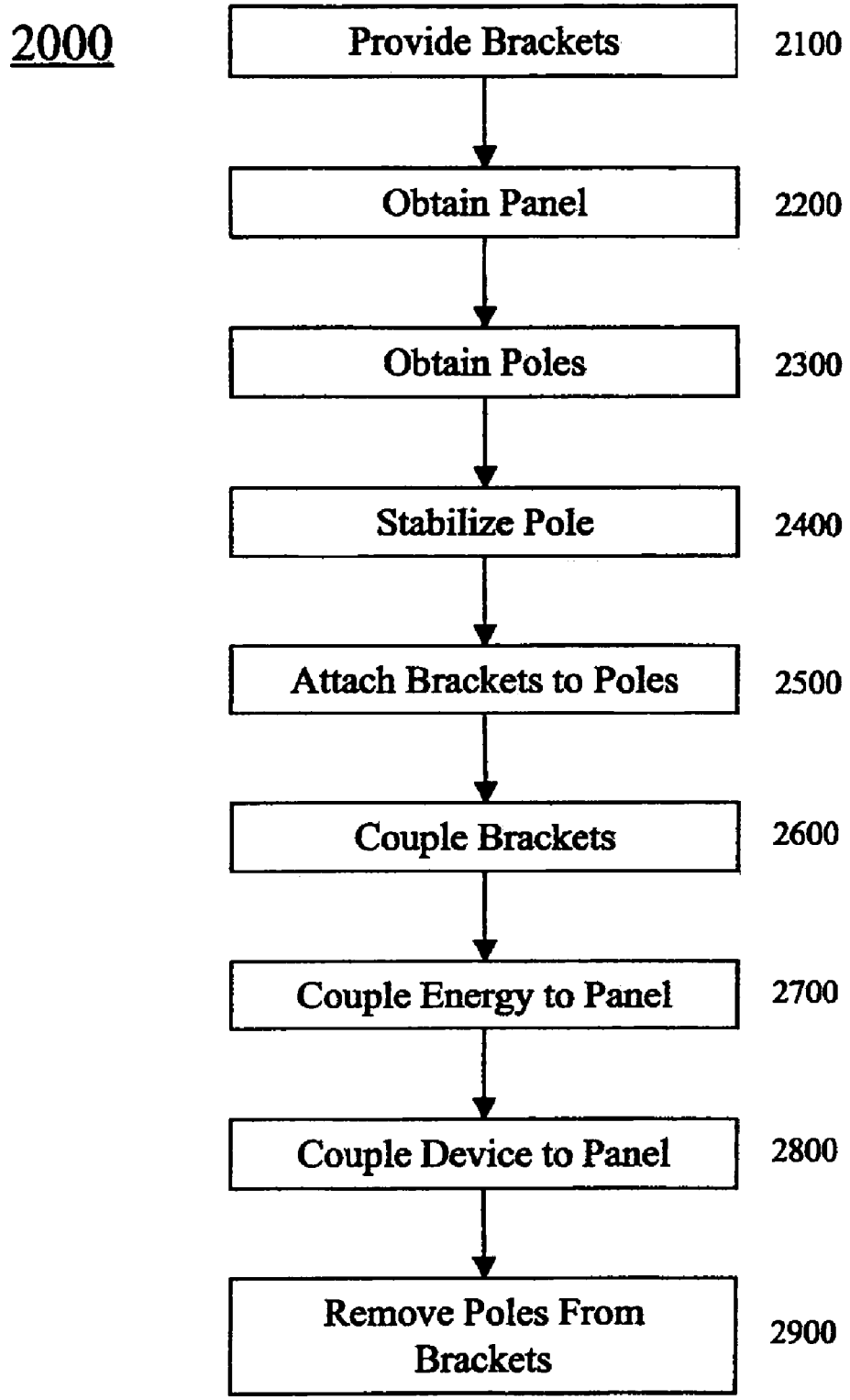
FIG. 2 is a block diagram of an exemplary embodiment of a method 2000.

FIG. 2 is a flowchart of an exemplary embodiment of a method 2000. At activity 2100, brackets can be provided. In certain exemplary embodiments, the brackets provided can comprise a first bracket, which can be adapted to be releaseably coupled to a first pole. The first bracket can comprise a collar, which can define a cavity. The cavity of the first bracket can be adapted to slideably receive the first pole. The collar of the first bracket can be adapted to define a fastener receiving opening. The fastener receiving opening of the collar of the first bracket can be adapted to receive a substantially non-destructively removable first fastener. The first fastener can be adapted to releaseably secure the first pole to the first bracket. In certain operative embodiments, removing the first fastener can allow a substantially non-destructive removal of the first pole from the first bracket.

The brackets can comprise a second bracket adapted to be releaseably coupled to a second pole. The second bracket can comprise a second collar, which can define a second cavity. The cavity of the second bracket can be adapted to slideably receive the second pole. The collar of the second bracket can be adapted to define a fastener receiving opening. The fastener receiving opening of the collar of the second bracket can be adapted to receive a substantially non-destructively removable second fastener. The second fastener can be adapted to releaseably secure the second pole to the second bracket. In certain operative embodiments, removing the second fastener can allow a substantially non-destructive removal of the second pole from the second bracket.

At activity 2200, a panel can be obtained, which can be adapted to mount on the first pole. The panel can be adapted to manage provision of electrical energy to an electrical device.

At activity 2300, poles can be obtained, such as the first pole and the second pole. The first pole can define a first longitudinal axis that can extend in a first direction and in an opposing second direction. The second pole can define a second longitudinal axis that can extend in a third direction and in an opposing fourth direction.

At activity 2400, the pole can be stabilized via installation into the ground, attachment to a natural surface, attachment to a man-made surface, placement on a stand, and/or suspension from an overhead structure, etc.

At activity 2500, the brackets can be attached to the poles. For example, the first bracket can be attached to the first pole. The first bracket can be adapted to restrain motion of the first pole relative to the first bracket in the first direction of the first longitudinal axis. The collar of the first bracket can be adapted to restrain motion of the first pole relative to the collar perpendicular to the first longitudinal axis. The collar of the first bracket can be adapted to restrain rotational motion of the first pole about the first longitudinal axis.

The second bracket can be attached to the second pole. The second bracket can be adapted to restrain motion of the second pole relative to the second bracket in the third direction of the second longitudinal axis. The collar of the second bracket can be adapted to restrain motion of the second pole relative to the collar perpendicular to the second longitudinal axis. The collar of the second bracket can be adapted to restrain rotational motion of the second pole about the second longitudinal axis.

The second bracket can be adapted to be coupled to the first bracket via a hinge. The second bracket can be adapted to be releaseably coupled to the first bracket via a substantially non-destructively removable third fastener.

At activity 2600, the first bracket can be releasably coupled to the second bracket. Releasably coupling the first bracket to the second bracket can result in the first longitudinal access being approximately co-linear to the second longitudinal axis, thereby forming a structure having a length approximately equal to the sum of the length of the first pole and the length of the second pole.

At activity 2700, an electrical energy supply can be electrically coupled to the panel. Electrical energy from the electrical energy supply can be single phase or three phase power. Electrical energy from the electrical energy supply can be any voltage, such as approximately 110, 220, 460, and/or 1200, etc.

At activity 2800, an electrical device can be electrically coupled to the panel. The panel, for example, can be adapted to supply electrical energy to the electrical device at a construction site.

At activity 2900, poles can be removed from the brackets. For example, the first pole can be non-destructively removed from the first bracket and/or the second pole can be non-destructively removed from the second bracket.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein. adjacent to each other.

What is claimed is:

1. A system comprising:

a first bracket made fit to be releaseably coupled to a first pole, said first bracket comprising a first collar defining a first cavity having a first fixed dimension made fit to slideably receive and fix the first pole in said first cavity in said first fixed dimension, said first collar defining a first fastener receiving opening, said first fastener receiving opening made fit to receive a substantially non-destructively removable first fastener, said first fastener made fit to releaseably secure the first pole to said first bracket, wherein removal of said first fastener allows a substantially non-destructive removal of the first pole from said first bracket, said first bracket made fit to restrain motion of the first pole relative to said first bracket in a first direction of a first longitudinal axis of said first collar, said first collar made fit to restrain motion of the first pole relative to said first collar perpendicular to said first longitudinal axis, said first collar made fit to restrain rotational motion of the first pole about said first longitudinal axis; and a second bracket made fit to be releaseably coupled to a second pole, said second bracket comprising a second collar defining a second cavity having a second fixed dimension made fit to slideably receive and fix the second pole in said second cavity in said second fixed dimension, said second collar defining a second fastener receiving opening, said second fastener receiving opening made fit to receive a substantially non-destructively removable second fastener, said second fastener made fit to releaseably secure the second pole to said second bracket, wherein removal of said second fastener allows a substantially non-destructive removal of the second pole from said second bracket, said second bracket made fit to restrain motion of the second pole relative to said second bracket in a first direction of a second longitudinal axis of said second collar, said second collar made fit to restrain motion of the second pole relative to said second collar perpendicular to said second longitudinal axis of said second collar, said second collar made fit to restrain rotational motion of the second pole about said second longitudinal axis of said second collar, said second bracket coupled to said first bracket via a hinge, said second bracket made fit to be releaseably coupled to said first bracket via a substantially non-destructively removable third fastener.

2. The system of claim 1, further comprising:
a first pole; and
a second pole.

3. The system of claim 1, further comprising:
a plurality of fasteners comprising a first fastener, a second fastener, and a third fastener.

4. The system of claim 1, wherein said first bracket is releaseably coupled to said second bracket via a flange.

5. The system of claim 2, wherein said first bracket comprises a cap made fit to rest against an end of said first pole.

6. A system comprising:
a first pole;
a second pole;
a first bracket made fit to be releaseably coupled to the first pole, said first bracket comprising a first collar defining a first cavity, said first collar made fit to slideably receive the first pole in said first cavity, said first collar defining a first fastener receiving opening, said first fastener receiving opening made fit to receive a substantially non-destructively removable first fastener, said first fastener made fit to releaseably secure the first pole to said first bracket, wherein removal of said first fastener allows a substantially non-destructive removal of the first pole from said first bracket, said first bracket made fit to restrain motion of the first pole relative to said first bracket in a first direction of a first longitudinal axis of said first collar, said first collar made fit to restrain motion of the first pole relative to said first collar perpendicular to said first longitudinal axis, said first collar made fit to restrain rotational motion of the first pole about said first longitudinal axis;
a second bracket made fit to be releaseably coupled to the second pole, said second bracket comprising a second collar defining a second cavity, said second collar made fit to slideably receive the second pole in said second cavity, said second collar defining a second fastener receiving opening, said second fastener receiving opening made fit to receive a substantially non-destructively removable second fastener, said second fastener made fit to releaseably secure the second pole to said second bracket, wherein removal of said second fastener allows a substantially non-destructive removal of the second pole from said second bracket, said second bracket made fit to restrain motion of the second pole relative to said second bracket in a first direction of a second longitudinal axis of said second collar, said second collar made fit to restrain motion of the second pole relative to said second collar perpendicular to said second longitudinal axis of said second collar, said second collar made fit to restrain rotational motion of the second pole about said second longitudinal axis of said second collar, said second bracket coupled to said first bracket via a hinge, said second bracket made fit to be releaseably coupled to said first bracket via a substantially non-destructively removable third fastener; and
a breaker panel mounted on said first pole, said breaker panel made fit to manage provision of electrical energy to at least one electrical device.

7. The system of claim 6, further comprising:
a plurality of electrical wires electrically coupling said breaker panel to said at least one electrical device.

8. The system of claim 6, further comprising:
a breaker secured in said breaker panel.

9. The system of claim 6, further comprising a plurality of fasteners comprising a first fastener, a second fastener, and a third fastener.

10. The system of claim 6, wherein said first bracket is releaseably coupled to said second bracket via a flange.

11. The system of claim 6, wherein said first bracket comprises a cap made fit to rest against an end of said first pole.

12. A system comprising:
a first bracket made fit to be releaseably coupled to a first pole, said first bracket comprising a first collar defining a first cavity, said first collar made fit to slideably receive the first pole in said first cavity, said first collar defining a first fastener receiving opening, said first fastener receiving opening made fit to receive a substantially non-destructively removable first fastener, said first fastener made fit to releaseably secure the first pole to said first bracket, wherein removal of said first fastener allows a substantially non-destructive removal of the first pole from said first bracket, said first bracket made fit to restrain motion of the first pole relative to said first bracket in a first direction of a first longitudinal axis of said first collar, said first collar made fit to restrain motion of the first pole relative to said first collar perpendicular to said first longitudinal axis, said first collar made fit to restrain rotational motion of the first pole about said first longitudinal axis, said first bracket including a first flange defining a first plane perpendicular to the first longitudinal axis; and
a second bracket made fit to be releaseably coupled to a second pole, said second bracket comprising a second collar defining a second cavity, said second collar made fit to slideably receive the second pole in said second cavity, said second collar defining a second fastener receiving opening, said second fastener receiving opening made fit to receive a substantially non-destructively removable second fastener, said second fastener made fit to releaseably secure the second pole to said second bracket, wherein removal of said second fastener allows a substantially non-destructive removal of the second pole from said second bracket, said second bracket made fit to restrain motion of the second pole relative to said second bracket in a first direction of a second longitudinal axis of said second collar, said second collar made fit to restrain motion of the second pole relative to said second collar perpendicular to said second longitudinal axis of said second collar, said second collar made fit to restrain rotational motion of the second pole about said second longitudinal axis of said second collar, said second bracket including a second flange defining a second plane perpendicular to the second longitudinal axis, said second bracket coupled to said first bracket via a hinge, said second bracket made fit to be releaseably coupled to said first bracket via a substantially non-destructively removable third fastener coupling the first and second flanges.

13. The system of claim 12, further comprising:
a first pole; and
a second pole.

14. The system of claim 12, further comprising a plurality of fasteners comprising a first fastener, a second fastener, and a third fastener.

* * * * *